(12) United States Patent
Sasage

(10) Patent No.: US 7,975,112 B2
(45) Date of Patent: Jul. 5, 2011

(54) SWITCH APPARATUS

(75) Inventor: Koutarou Sasage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 12/410,543

(22) Filed: Mar. 25, 2009

(65) Prior Publication Data

US 2009/0254719 A1 Oct. 8, 2009

(30) Foreign Application Priority Data

Apr. 2, 2008 (JP) ................................. 2008-096410

(51) Int. Cl.
*G06F 12/00* (2006.01)

(52) U.S. Cl. ........................................................ 711/154

(58) Field of Classification Search ........................ None
See application file for complete search history.

(56) References Cited

U.S. PATENT DOCUMENTS

| | | | | |
|---|---|---|---|---|
| 6,941,432 | B2 * | 9/2005 | Ronstrom | 711/165 |
| 7,054,893 | B2 | 5/2006 | Mogi et al. | |
| 2003/0172149 | A1 * | 9/2003 | Edsall et al. | 709/224 |

FOREIGN PATENT DOCUMENTS

| | | |
|---|---|---|
| JP | 7-160548 | 6/1995 |
| JP | 2003-150414 | 5/2003 |
| JP | 2003-271425 | 9/2003 |
| JP | 2006-331458 | 12/2006 |

\* cited by examiner

*Primary Examiner* — Hiep T Nguyen

(74) *Attorney, Agent, or Firm* — Staas & Halsey LLP

(57) ABSTRACT

A method for controlling a switch apparatus connected to a first and a second storage apparatus, and a host, the switch apparatus managing a virtual storage area maintained by the first and second storage apparatuses, the host accessible to the virtual storage area by transmitting a command for identifying a subarea of the virtual storage area, the second storage apparatus allowable to an access faster than the first storage apparatus does, the method includes: receiving a command; determining which of the first and second storage apparatuses maintains the subarea to be accessed; accessing the subarea corresponding to the command; detecting a frequency of access to each of the subareas; and moving data stored in the first storage apparatus and having higher frequency of access than data stored in the second storage apparatus into the subareas maintained in the second storage apparatus.

6 Claims, 17 Drawing Sheets

FIG. 6

| VIRTUAL BLOCK | PHYSICAL BLOCK |
|---|---|
| V1 (01) | PA (01) |
| V1 (02) | PA (02) |
| ⋮ | ⋮ |
| V1 (M) | PA (M) |
| V1 (M+1) | PD (1) |
| ⋮ | ⋮ |
| V1 (M+N) | PD (N) |
| V1 (M+N+1) | PG (1) |
| ⋮ | ⋮ |
| V1 (M+N+K) | PG (K) |

FIG. 13A

INITIAL STATE — 1001

| VIRTUAL BLOCK | PHYSICAL BLOCK | DATA |
|---|---|---|
| V I | X | D 1 |
| V J | Y | D 2 |

FIG. 13B

STATE IN S123 — 1002

| VIRTUAL BLOCK | PHYSICAL BLOCK | DATA |
|---|---|---|
| V I | F | D 1 |
| V J | Y | D 2 |

STATE IN S125 — 1003

| VIRTUAL BLOCK | PHYSICAL BLOCK | DATA |
|---|---|---|
| V I | F | D 1 |
| V J | X | D 2 |

STATE IN S127 — 1004

| VIRTUAL BLOCK | PHYSICAL BLOCK | DATA |
|---|---|---|
| V I | Y | D 1 |
| V J | X | D 2 |

SWITCH APPARATUS

CROSS-REFERENCE TO RELATED APPLICATION

This application is based upon and claims the benefit of priority of the prior Japanese Patent Application No. 2008-096410, filed on Apr. 2, 2008 the entire contents of which are incorporated herein by reference.

FIELD

The embodiment discussed herein is related to a switch apparatus.

BACKGROUND

In some storage systems, a switch apparatus connects multiple host apparatus and multiple storage apparatus over a network to manage data exchange.

In order to effectively use physical storage areas in multiple storage apparatus in a storage system, a virtualization technology for storage apparatus is available. The virtualization for storage apparatus allows the definition of a virtual storage area including a combination of multiple storage apparatus. In some cases, a switch apparatus may manage the virtualization for storage apparatus. The switch apparatus connects between the multiple storage apparatus and a host apparatus. The related art is disclosed in Japanese Laid-open Patent Publication No. 2003-271425, Japanese Laid-open Patent Publication No. 2006-331458, Japanese Laid-open Patent Publication No. 2003-150414 and Japanese Laid-open Patent Publication No. 07-160548.

A switch apparatus may manage storage apparatus having different processing performances from the reception of a processing instruction for data reading or writing to the transmission of a response to the processing instruction. The virtual storage area managed by the switch apparatus includes physical storage areas in the storage apparatus having different processing performances. Therefore, the time from the transmission by a host apparatus of a processing instruction for data reading or writing to the switch apparatus to the reception by the host apparatus of the result of the processing instruction from the switch apparatus may differ in accordance with the performance of the storage apparatus.

SUMMARY

According to an aspect of the invention, a method for controlling a switch apparatus connected to a first storage apparatus, a second storage apparatus, and a host capable of accessing at least one storage area maintained by at least one of the first second storage apparatus and second storage apparatus by transmitting a command to the switch apparatus, the command identifying one of a plurality of subareas in the at least one storage area to be accessed, the second storage apparatus being capable of allowing an access faster than the first storage apparatus does, the method includes: receiving a command for accessing at least one of the subareas from the host by the switch apparatus; determining which of the first and second storage apparatuses maintains the at least one of the subareas to be accessed; allowing the switch apparatus to execute an access to the at least one of the subareas corresponding to the command; detecting a frequency of access to each of the subareas by the host; and moving either of data stored in at least one of the subareas maintained in the first storage apparatus and having higher frequency of access into the second storage apparatus and data stored in at least one of the subareas maintained in the second storage apparatus and having lower frequency of access into the first storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 illustrates virtual volume information 222 associating with the virtual volume V1.

FIG. 13A, FIG. 13B, FIG. 13C, and FIG. 13D are diagrams illustrating a relationship among virtual blocks, physical blocks and data by the interchange processing.

FIG. 14 is a diagram illustrating a relationship between a file and data.

DESCRIPTION OF EMBODIMENT

An embodiment of the present invention will be described with reference to accompanying drawings.

[Storage System]

Figure 1:
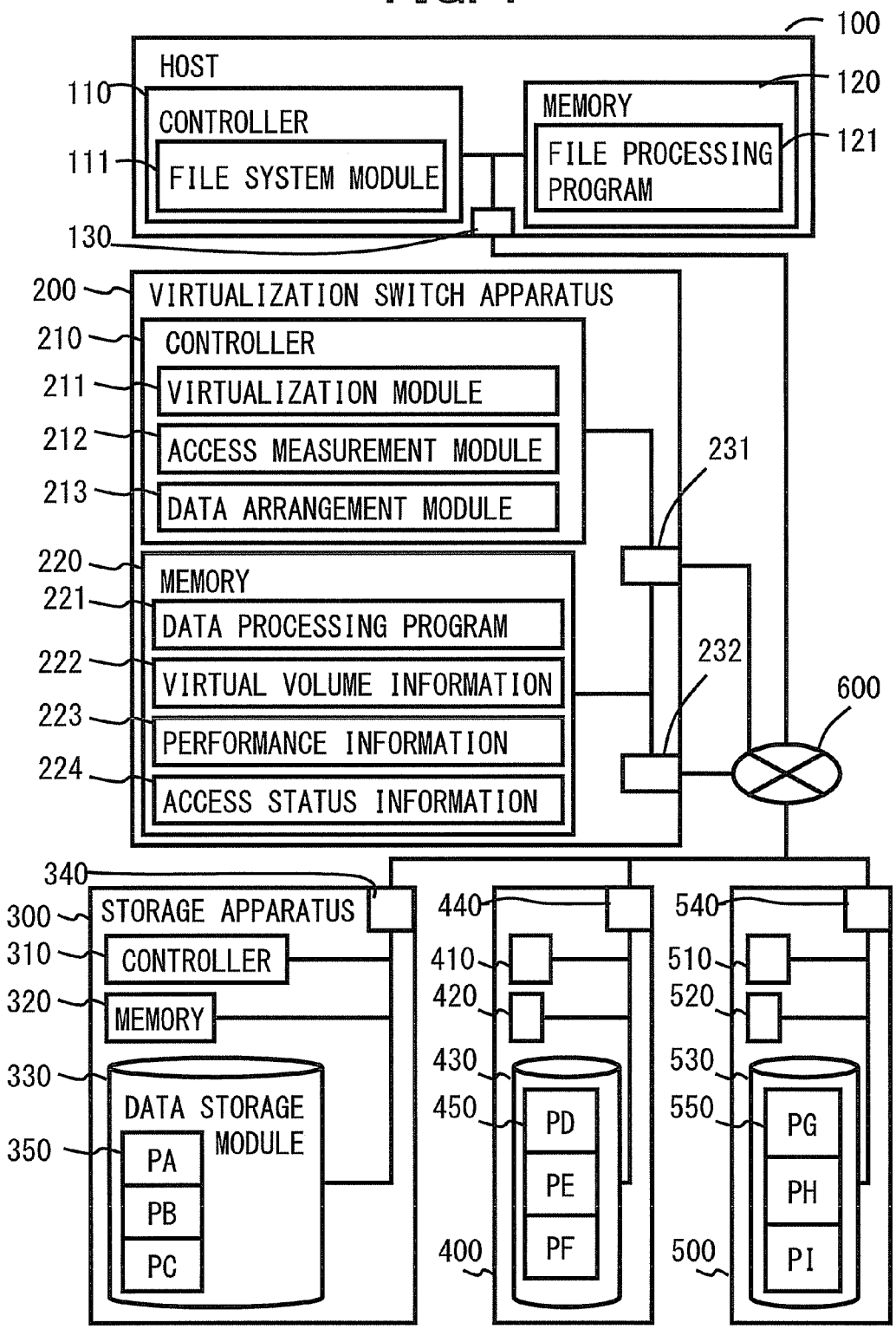
FIG. 1 is an example of the storage system of this embodiment.

FIG. 1 is an example of the storage system of this embodiment. The storage system of this embodiment includes a host apparatus 100, a storage apparatus 300, a storage apparatus 400, a storage apparatus 500 and a virtualization switch apparatus 200. The host apparatus 100 and the virtualization switch apparatus 200, the virtualization switch apparatus 200 and the storage apparatus 300 and the storage apparatus 400 and the storage apparatus 500 may be connected over a network 600 such as a storage area network.

The switch apparatus allows the connection between storage apparatus having different processing performances and a host apparatus and allows fast responses for data frequently accessed by host apparatus. The switch apparatus connects to a first storage apparatus having a first physical storage area storing data, a second storage apparatus having a second physical storage area storing data, and a host apparatus. The second storage apparatus can perform processing from the reception of a processing instruction for data reading or writing to the transmission of a response to the processing instruction in a shorter period of time than the first storage apparatus. The switch apparatus detects the frequency of access to the first physical storage area and migrates data stored in the first physical storage area with a higher frequency of access to the second physical storage area. The migration by the switch apparatus of highly frequently accessed data stored in a storage apparatus with a low processing performance to a storage apparatus with a high processing performance allows a fast response for data frequently accessed by a host apparatus.

[Host Apparatus 100]

The host apparatus 100 may be a personal computer, a workstation or a mainframe, for example. The host apparatus 100 uses various files for executing application programs. The files are stored in the storage apparatus 300, the storage apparatus 400 and the storage apparatus 500.

The host apparatus 100 accesses a data storage area in the storage apparatus 300, storage apparatus 400 or storage apparatus 500 storing data through the virtualization switch apparatus 200 to read a file or to write a file. An instruction to read a file (read instruction) or an instruction to write a file (write instruction) includes identification information of either read instruction or write instruction, address information to be processed, and write data information.

The host apparatus 100 includes a controller 110, a memory 120 and an input/output module 130. The input/output module 130 connects the host apparatus 100 to the virtualization switch apparatus 200 over the network 600. The memory 120 stores a file processing program 121. The controller 110 executes the file processing program 121 to function as a file system module 111. The controller 110 may be, for example, a central processing unit (CPU) or other processing unit. In order to execute read access or write access to a storage apparatus, the file system module 111 transmits a data read instruction or data write instruction to the virtualization switch apparatus 200.

[Storage Apparatus]

The storage apparatus 300, storage apparatus 400 and storage apparatus 500 store files based on a command sent from the host apparatus 100. It is assumed that the storage apparatus 300, storage apparatus 400 and storage apparatus 500 of this embodiment have different access performances in accordance with the product types and the internal configurations of the storage apparatus. It is assumed in this embodiment that the storage apparatus 300 has a highest performance, the storage apparatus 500 has a lowest performance and, the storage apparatus 400 has a performance between those of the storage apparatus 300 and the storage apparatus 500.

The storage apparatus 300 includes a controller 310, a memory 320, a data storage module 330 and an input/output module 340. The storage apparatus 400 includes a controller 410, a memory 420 and a data storage module 430. The storage apparatus 500 includes a controller 510, a memory 520 and a data storage module 530. Notably, because the common configuration is adopted in the storage apparatus 300, storage apparatus 400 and storage apparatus 500, the storage apparatus 300 will be only described below.

The input/output module 340 connects the storage apparatus 300 to the virtualization switch apparatus 200 over the network 600. The memory 320 stores a control program to be executed by the controller 310 and a result of execution by the controller 310. The memory 320 may be, for example, a data readable/writable memory (RAM) or a data read-only memory (ROM).

The controller 310 executes data writing to the data storage module 330 or data reading from the data storage module 330 in accordance with the data read instruction or data write instruction received from the virtualization switch apparatus 200. The controller 310 may be, for example, a central processing unit (CPU) or other processing unit.

It is assumed that a physical volume (subarea) 350 is predefined in a data storage area in the data storage module 330. The physical volume 350 is a set of multiple physical blocks which can be used by the host apparatus 100 to store files. The physical volume 350 can divide a data storage area in a storage apparatus in an arbitrary size. The PA, PB and PC in FIG. 1 refer to the physical volumes 350, which are defined in the data storage module 330 in the storage apparatus 300.

Now, the relationship between files and blocks will be described. The host apparatus 100 handles a file as a unit to manage data. The virtualization switch apparatus 200 and the storage apparatus 300 handle a block as a unit to manage data. The host apparatus 100 has a correspondence relationship between a file and a block. The file is a combination of data stored in multiple blocks. The host apparatus 100 identifies the block corresponding to a file to access a storage apparatus through the virtualization switch apparatus 200. The physical block is a unit of data reading or writing to or from a data storage area in a storage apparatus.

[Virtualization Switch Apparatus 200]

The virtualization switch apparatus 200 manages data to be exchanged between the host apparatus 100 and the storage apparatus 300 and the storage apparatus 400 and the storage apparatus 500. The virtualization switch apparatus 200 virtualizes physical volumes in the storage apparatus 300, the storage apparatus 400 and the storage apparatus 500. The term "virtualize" refers to defining a virtual volume (storage area) including a combination of physical volumes in multiple storage apparatus.

The virtualization switch apparatus 200 manages data at least one storage area maintained by the storage apparatuses 300, 400, and 500. The host apparatus 100 can access data at least one storage area maintained by the storage apparatuses 300, 400, and 500 by transmitting a command to virtualization switch apparatus 200. The command identifies one of a plurality of physical volumes in the at least one storage area to be accessed.

The virtualization switch apparatus 200 can eliminate the necessity for the host apparatus 100 to manage the configuration of physical volumes in the storage apparatus 300, storage apparatus 400 and storage apparatus 500 relating to the host apparatus 100. The host 100 may access a physical volume in the storage apparatus 300, storage apparatus 400 and storage apparatus 500 only accessing a virtual block managed by a virtualization module 211. On the other hand, a host apparatus manages physical volumes in each of general storage apparatus without the virtualization function. The requirement for a host apparatus to handle physical volumes in storage apparatus as a unit for management may increase the load on a manager of the host apparatus.

The virtualization switch apparatus 200 performs data management on physical volumes on the basis of the tendency of accesses from the host apparatus 100 to a virtual volume so as to reduce the time for accessing the physical volume corresponding to the virtual volume in the entire system.

Many file data pieces in volumes managed by the file system module 111 in the host apparatus 100 do not always have a uniform frequency of access. Some files may have a significantly high frequency of access while some files may be rarely accessed.

It is assumed that data corresponding to a file with a high frequency of access by the host apparatus 100 is in a low performance physical volume through a virtual block. On the other hand, it is assumed that data corresponding to a file with a low frequency of access by the host apparatus 100 is in a high performance physical volume through a virtual block.

In this case, the average access performance in the entire system is that of the physical volume with a low access performance. Then, the virtualization switch apparatus 200 changes the correspondence relationship between the virtual block and the physical blocks on the basis of the access statuses.

Figure 2:
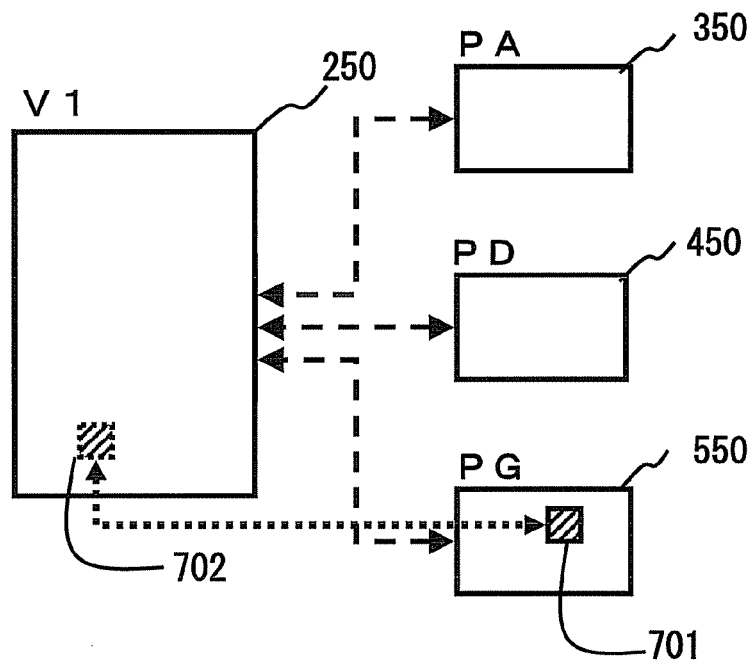
FIG. 2 is a diagram illustrating the outline of rearrangement processing.
Figure 3:
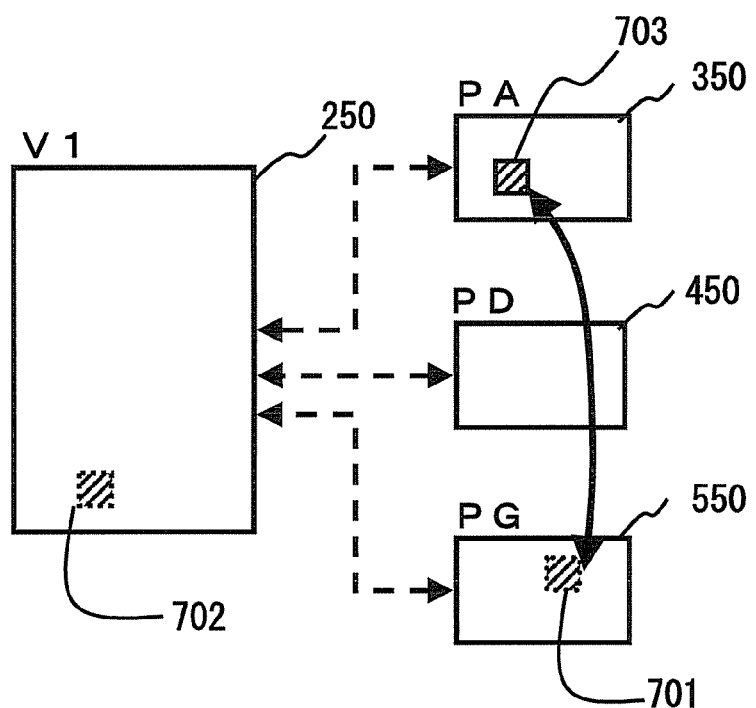
FIG. 3 is a diagram illustrating the outline of rearrangement processing.
Figure 4:
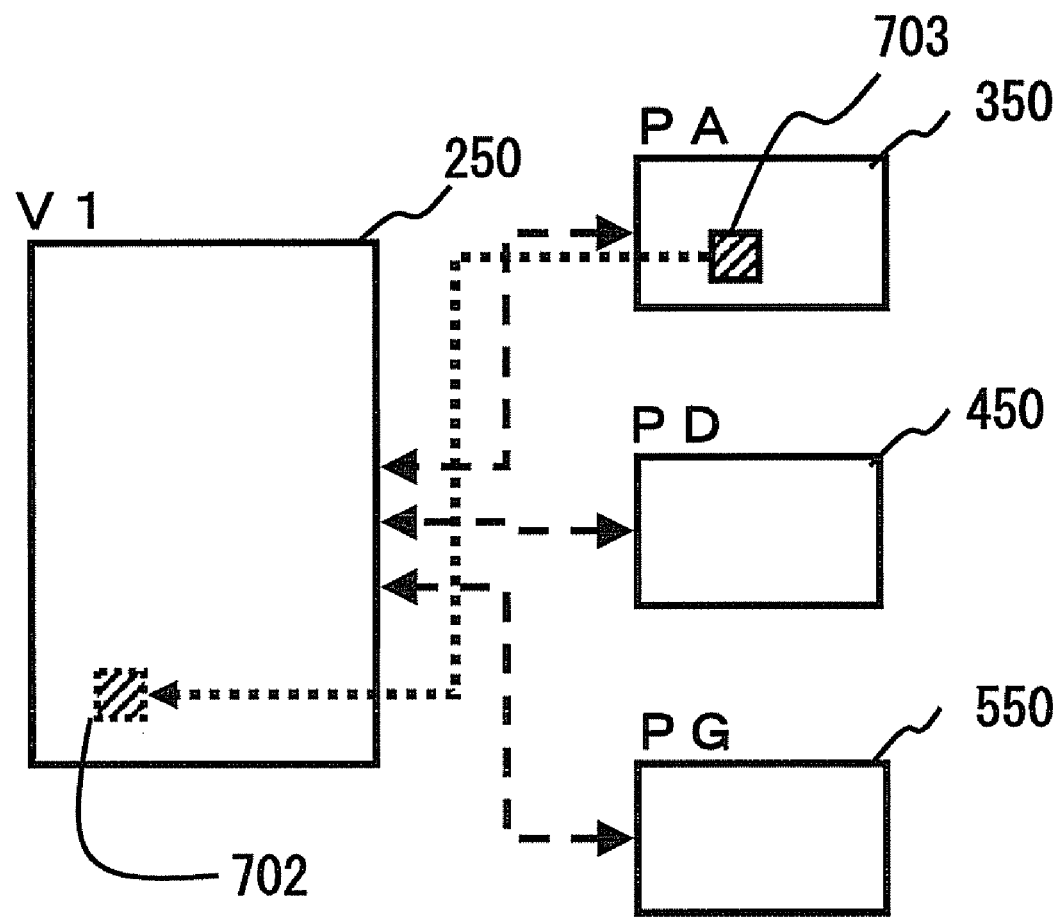
FIG. 4 is a diagram illustrating the outline of rearrangement processing.

The outline of rearrangement processing will be described with reference to FIGS. 2 to 4. FIGS. 2 to 4 are diagrams illustrating the outline of rearrangement processing. The reference numeral 250 refers to a virtual volume V1 managed by the virtualization switch apparatus 200. The reference numeral 350 refers to one physical volume PA within the data storage module 330 in the storage apparatus 300. The reference numeral 450 refers to one physical volume PD within the data storage module 430 in the storage apparatus 400. The reference numeral 550 refers to one physical volume PG within the data storage module 530 in the storage apparatus 500. It is assumed that the physical volume PA has a highest access performance to the virtualization switch apparatus 200 while the physical volume PG has a lowest one. It is assumed that the volume PD has one between those of physical volumes PA and PG.

A virtual block in the virtual volume V1 corresponds to a physical block in the physical volume PA, PD, or PG. The reference numeral 701 refers to an arbitrary physical block in the physical volume PG. The reference numeral 702 refers to a virtual block corresponding to a physical block 701 in the virtual volume V1.

The access from the host apparatus 100 to the virtual block 702 requires the virtualization switch apparatus 200 to access the physical block 701 corresponding to the virtual block 702 because real data is stored in the physical block 701. Therefore, as the number of accesses to the virtual block 702 increases, the access performance of the entire system decreases.

Accordingly, the virtualization switch apparatus 200 copies the data stored in the physical block 701 to the physical volume PA, as illustrated in FIG. 3. After that, the virtualization switch apparatus 200 associates the physical block 703 and the virtual block 702, as illustrated in FIG. 4.

This processing updates the physical block corresponding to the virtual block 702 from the physical block 701 to the physical block 703. The physical volume PA in the physical block 703 has a higher access performance than that of the physical volume PG in the physical block 701. Therefore, in the access from the host apparatus 100 to virtual block 702, the access performance between the virtualization switch apparatus 200 and the physical volume can be improved. As a result, the access performance of the entire system improves.

The virtualization switch apparatus 200 includes a controller (processor) 210, a memory 220, an input/output module 231 and an input/output module 232. The input/output module (interface) 231 connects the virtualization switch apparatus 200 to the host apparatus 100 over the network 600. The input/output module (interface) 232 connects the virtualization switch apparatus 200 to the storage apparatus 300, storage apparatus 400 and storage apparatus 500 over the network 600.

Next, the controller 210 in the virtualization switch apparatus 200 will be described. The controller 210 executes a data processing program 221 stored in the memory 220 to function as the virtualization module 211, an access measurement module 212 and a data arrangement module 213. The controller 210 may be, for example, a central processing unit (CPU) or other processing unit.

The controller 210 executes a process. The process includes receiving a command for accessing at least one of the physical volumes from the host 100. The process includes determining which of the storage apparatus 300, storage apparatus 400 and storage apparatus 500 maintains the at least one of the physical volumes to be accessed. The process includes allowing the virtualization switch apparatus 200 to execute an access to the at least one of the physical volume corresponding to the command. The process includes detecting a frequency of access to each of the physical volumes by the host 100. For example, the storage apparatus 300 is capable of allowing an access faster than the storage apparatus 400 does. The process includes moving either of data stored in at least one of the physical volumes maintained in the storage apparatus 400 and having higher frequency of access into the storage apparatus 300 and data stored in at least one of the physical volumes maintained in the storage apparatus 300 and having lower frequency of access into the storage apparatus 400.

The memory 220 may store the data processing program 221, virtual volume information 222, performance information 223 and access status information 224. The memory 220 may be, for example, a data readable/writable memory (RAM) or a data read-only memory (ROM).

[Data Processing Program 221]

The data processing program 221 is a written procedure for causing the controller 210 to execute virtualization processing for a storage apparatus, rearrangement processing on data stored in storage apparatus, processing of obtaining access status information from the host apparatus 100 to a virtual block.

[Virtual Volume Information 222]

A virtual volume is virtual volume information to be managed by the virtualization switch apparatus 200. It is assumed in this embodiment that the virtual volume information 222 is pre-registered. The virtual volume information 222 may be registered by a manager, for example.

The virtual volume information 222 is information describing a relationship between virtual volumes and physical volumes. More specifically, the virtual volume information 222 is information that associates address information (or virtual block address) of a virtual block in a virtual volume and address information (or physical block address) of a physical block in a storage apparatus.

The size of virtual block to divide a virtual volume may be designated by a manager in creating the virtual volume, for example. The virtualization switch apparatus 200 may not change the size of a virtual block when the virtual volume is in use. Notably, it is assumed that the data size corresponding to the virtual block of this embodiment is equal to the data size corresponding to the physical block.

Figure 5:
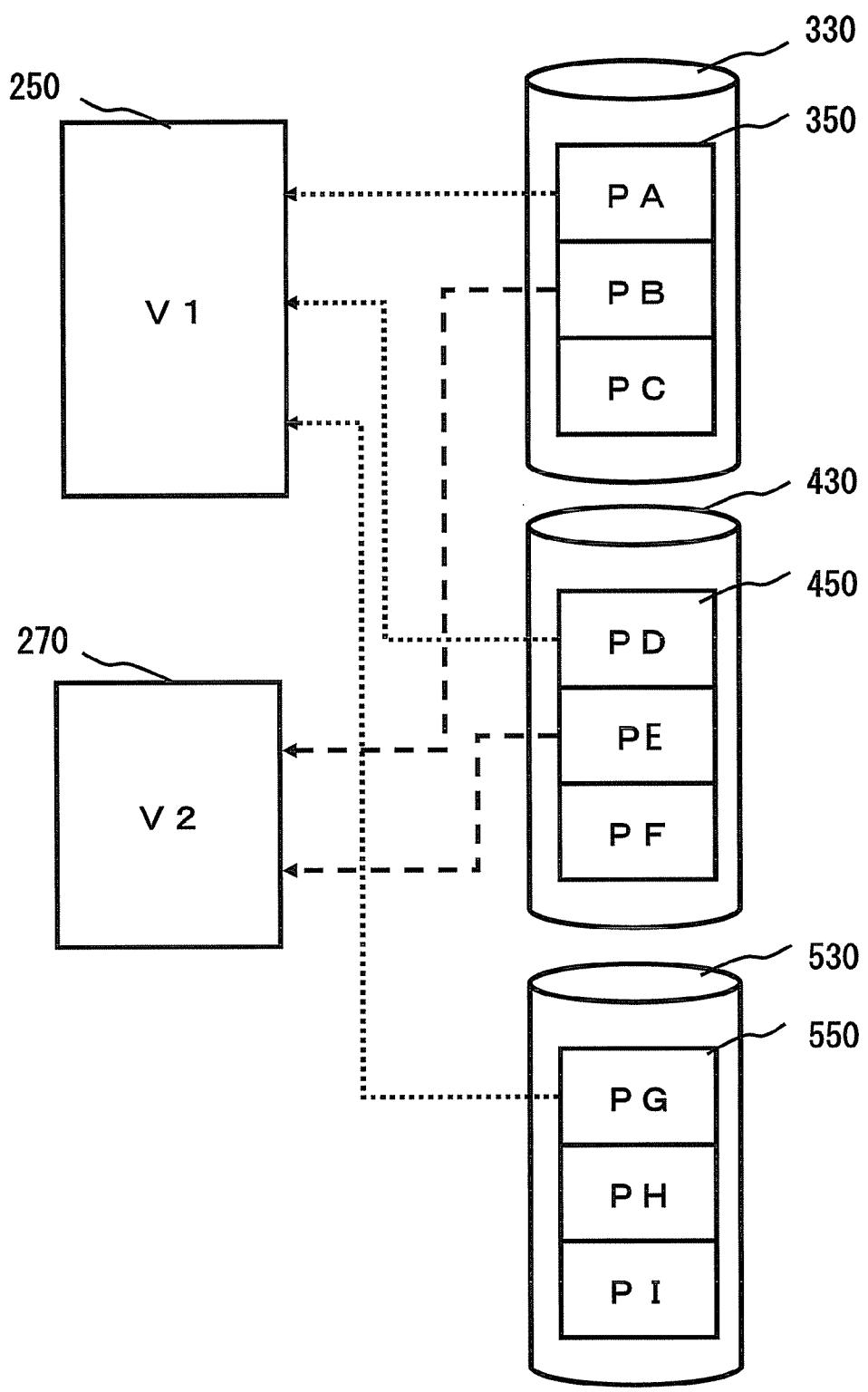
FIG. 5 is a diagram illustrating a relationship between virtual volumes and physical volumes.

FIG. 5 is a diagram illustrating a relationship between virtual volumes and physical volumes. The reference numerals 250 and 270 refer to virtual volumes managed by the virtualization module 211. The reference numeral 350 refers to a physical volume in the data storage module 330 in the storage apparatus 300. The reference numeral 450 refers to a physical volume in the data storage module 430 in the storage apparatus 400. The reference numeral 550 refers to a physical volume in the data storage module 530 in the storage apparatus 500. It is assumed here that the virtual volumes managed by the virtualization module 211 are a virtual volume V1 and a virtual volume V2. The virtual volume V1 is associated with the physical volume PA, physical volume PD and physical volume PG. The virtual volume V2 is associated with the physical volume PB and a physical volume PE. Notably, it is assumed here that the virtual volume VI is allocated to the host apparatus 100 of this embodiment.

FIG. 6 illustrates the virtual volume information 222 associating with the virtual volume V1. The virtual volume information 222 is information that associates a virtual block in a virtual volume and a physical block in a physical volume. A virtual block 2221 has items of address information of each virtual block in the virtual volume V1. A physical block 2222 has items of address information of each physical block in the physical volume PA, physical volume PD and physical volume PG. If storage apparatus have different access performance and if physical volume areas in the storage apparatus are combined to create a virtual volume, a virtual block occurs which has different access performances in a virtual volume.

The virtualization switch apparatus 200 uses the virtual volume information 222 to manage the correspondence relationship between a virtual block and a physical block. If the host apparatus 100 accesses a virtual block, the virtualization switch apparatus 200 identifies the physical block corresponding to the virtual block by the virtual volume information 222. After that, the virtualization switch apparatus 200 accesses the physical block corresponding to the access by host apparatus 100.

[Virtualization Module 211]

The controller 210 in the virtualization switch apparatus 200 executes the data processing program 221 stored in the memory 220 to function as the virtualization module 211. The virtualization module 211 manages virtual volumes corresponding to combinations of a part or all of the physical volume in the storage apparatus 300, storage apparatus 400 and storage apparatus 500 connecting to the virtualization switch apparatus 200.

The virtualization module 211 causes the host apparatus 100 to recognize a virtual volume. If the virtualization module 211 receives an access from the host apparatus 100 to a virtual block, the virtualization module 211 refers to the virtual volume information 222 to identify the physical block corresponding to the storage apparatus corresponding to the virtual block. After that, the virtualization module 211 accesses the identified physical block.

[Performance Information 223]

The performance information 223 stores information on access performances of the storage apparatus 300, storage apparatus 400 and storage apparatus 500 managed by the virtualization switch apparatus 200.

Figure 7:
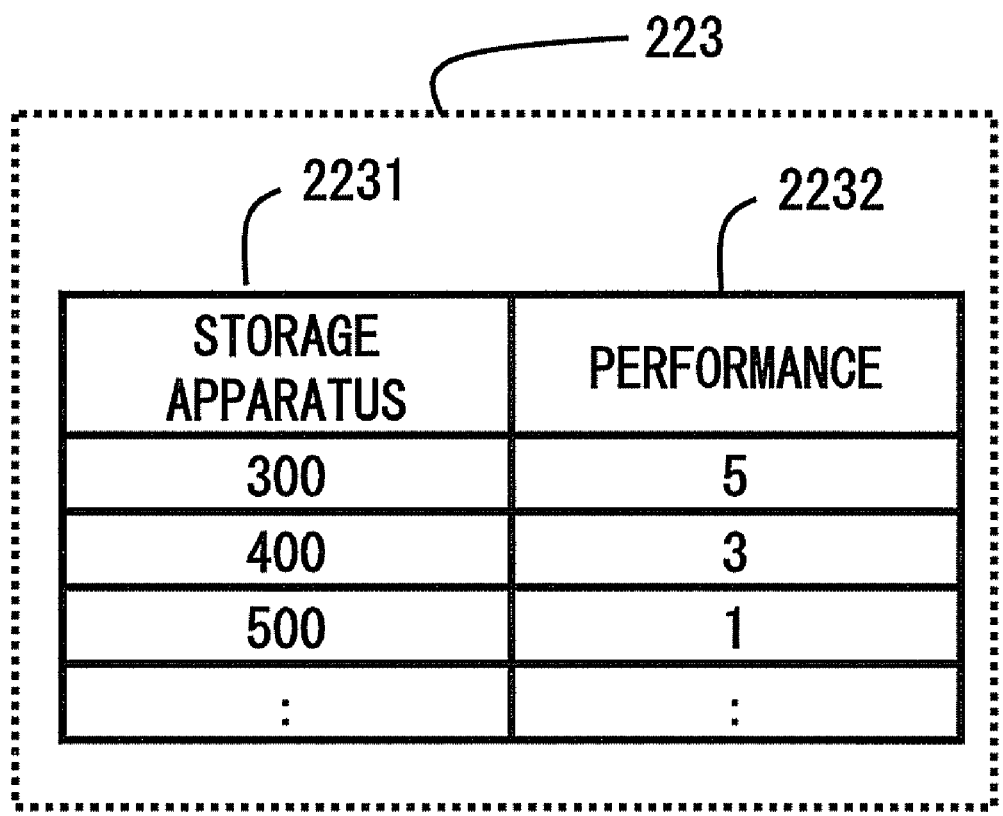
FIG. 7 illustrates performance information 223.

FIG. 7 illustrates the performance information 223. The performance information 223 stores information identifying a storage apparatus and a performance of a storage apparatus in numerical form in association. The information for identifying a storage apparatus is stored under a "storage apparatus 2231". The information on the performance parameter of a storage apparatus is stored under a "performance 2232". In FIG. 7, the performance parameter of the storage apparatus 300 is "5", the performance parameter of the storage apparatus 400 is "3", and the performance parameter of the storage apparatus 300 is "1". It is assumed that the level of the performance of the storage apparatus of this embodiment increases as the performance parameter increases. In FIG. 7, the performance of the storage apparatus 300 is the highest, and the performance of the storage apparatus 500 is the lowest. The performance of the storage apparatus 400 is between those of the storage apparatus 300 and the storage apparatus 500.

The virtualization switch apparatus 200 measures the access performance of a physical volume to obtain the performance information 223. The virtualization switch apparatus 200 measures an average access performance in predetermined multiple kinds of patterns by accessing blocks in different sizes and in different directions of access.

The virtualization switch apparatus 200 can obtain the performance information 223 by handling a physical volume as a unit or by handling the storage apparatus 300 to 500 as a unit.

Notably, the virtualization switch apparatus 200 of this embodiment measures the access performance when a virtual volume is created from a physical volume. This is because the processing for measuring an access performance may possibly lower the performance of data access if the virtualization switch apparatus 200 measures the access performance during the execution of the data access from the virtualization switch apparatus 200 to a physical volume. The change of state due to the occurrence of a failure in a physical volume may temporarily deteriorate the access performance from the virtualization switch apparatus 200 to a physical volume. If the access performance of a high-performance physical volume is deteriorated temporarily due to an internal failure, the access performance is recovered by the resolution of the failure. Therefore, it is not necessary to determine the performance on the basis of the temporarily deteriorated access performance. From this point of view, measuring the access performance during the execution of data access from the virtualization switch apparatus 200 to a physical volume may possibly cause the execution of interchange processing on virtual blocks and physical blocks more than necessary.

[Access Status Information 224]

The access status information 224 is access status information from the host apparatus 100 to a virtual block managed by the virtualization switch apparatus 200. The access status information may be, for example, information describing the number of accesses to a virtual block by the host apparatus 100 (or the number-of-accesses information) or information on the last-accessed time to a virtual block by the host apparatus 100 (or access time information).

Figure 8:
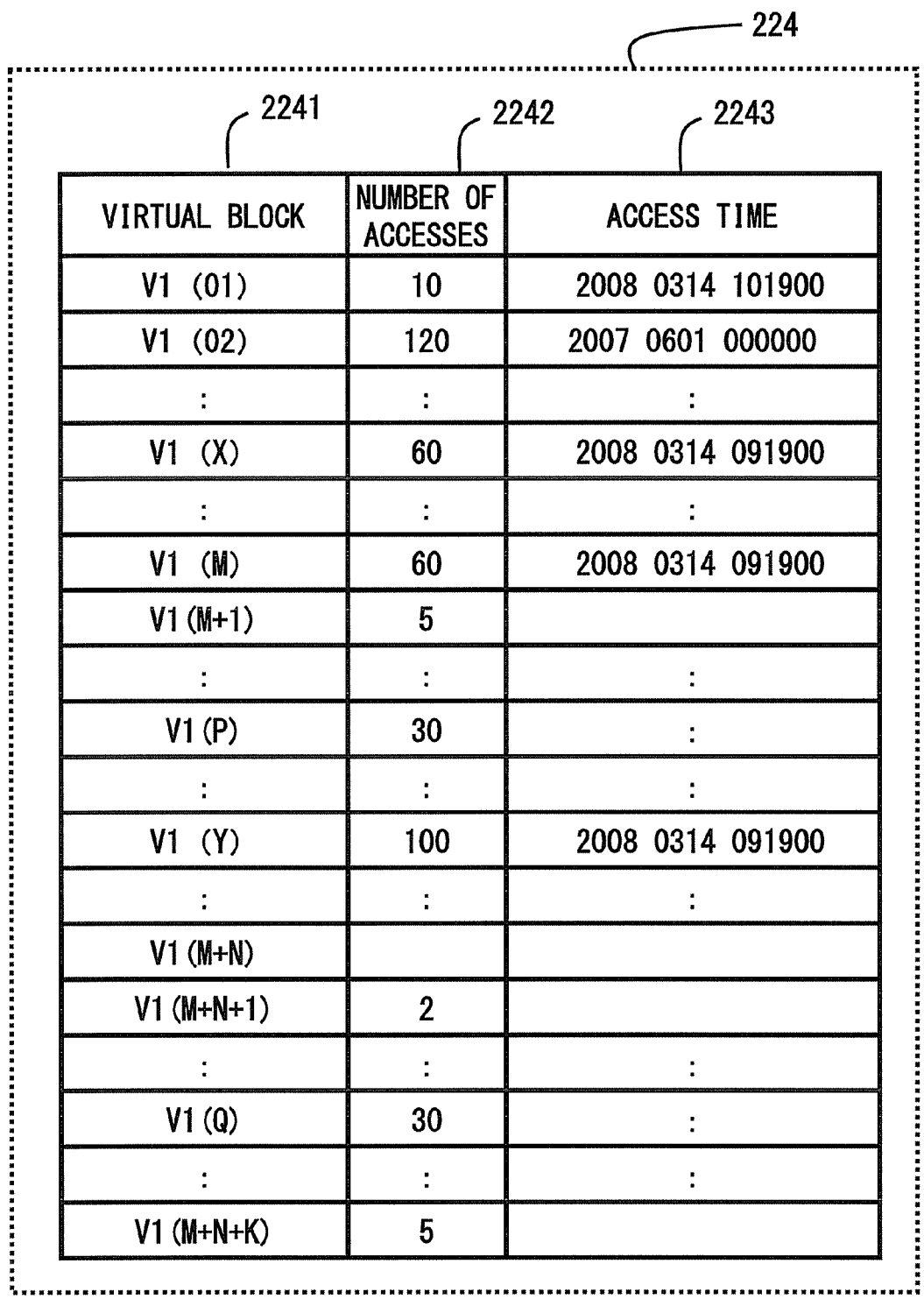
FIG. 8 illustrates the access status information 224.

FIG. 8 illustrates the access status information 224. The access status information 224 has virtual block information for locating a virtual block within a virtual volume, the number-of-accesses information and access time information. The address information of a virtual block is stored under a "virtual block 2241". The number of accesses to a virtual block is stored under a "number of accesses 2242". The last-accessed time for the virtual blocks is stored under an "access time 2243". A virtual block corresponds to a virtual block in the virtual volume information 222. The virtualization switch apparatus 200 stores the number-of-accesses information and access time information in association with each virtual block.

[Access Measurement Module 212]

The controller 210 in the virtualization switch apparatus 200 executes the data processing program 221 stored in the memory 220 to function as the access measurement module 212.

The access measurement module 212 stores the status that the host apparatus 100 accesses a virtual block in the access status information 224. If the access measurement module 212 obtains the access information on the host apparatus 100, the access measurement module 212 identifies the virtual block to be accessed from the obtained access information.

The access measurement module 212 updates the number-of-accesses information in the access status information 224 corresponding to the identified virtual block. The access measurement module 212 updates the access time information in the access status information 224 corresponding to the identified virtual block.

Figure 9:
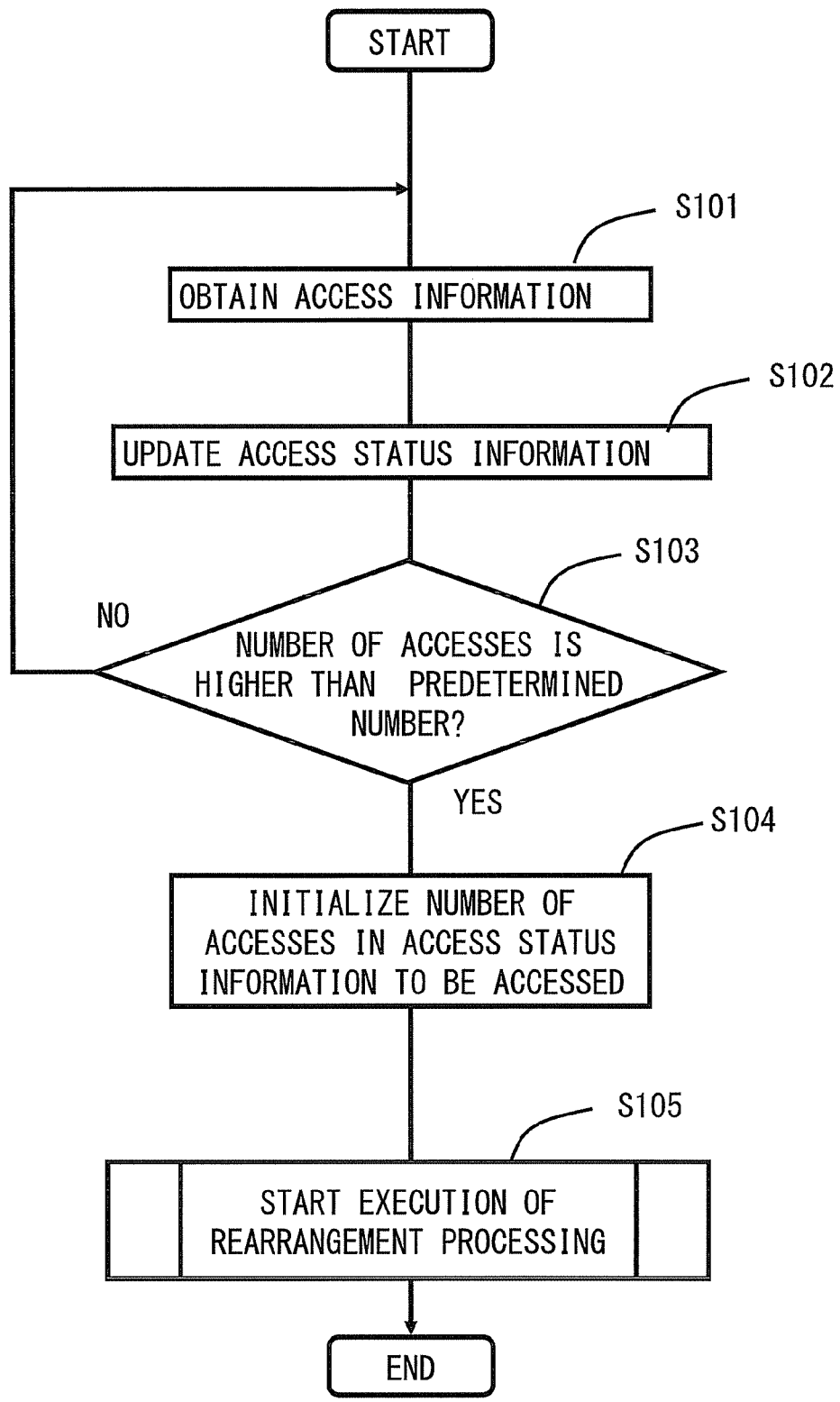
FIG. 9 is a flowchart for access measurement processing.

FIG. 9 is a flowchart for the access measurement processing of this embodiment. The access measurement module 212 obtains access information from the host apparatus 100 (S101). The access measurement module 212 updates the access status information 224 (S102). More specifically, the access measurement module 212 obtains the number of accesses for each virtual block from the access information obtained in S101 and increments by one the number of accesses in the access status information 224 corresponding to the virtual block to be accessed. The access measurement module 212 updates the access time information in the access status information 224 corresponding to the virtual block to be accessed with the access-received time.

The access measurement module 212 determines whether the number of accesses to the virtual block to be accessed is higher than a predetermined number or not (S103). Notably, the threshold value of the number of accesses for determining whether the interchange processing on the physical block corresponding to a virtual block is to be executed or not may be registered by a manager, for example.

If the number of accesses to the virtual block to be accessed is lower than the predetermined number (S103: No), the access measurement module 212 returns to S101 and obtains the access information from the host apparatus 100. On the other hand, if the number of accesses to the block is equal to or higher than the predetermined number (S103: Yes), the access measurement module 212 initializes the number of accesses in the access status information 224 of the virtual block to be accessed (S104). After that, the virtualization switch apparatus 200 starts the execution of rearrangement processing (5105). The rearrangement processing is executed by the data arrangement module 213.

[Data Arrangement Module 213]

The controller 210 in the virtualization switch apparatus 200 executes the data processing program 221 stored in the memory 220 to function as the data arrangement module 213.

The data arrangement module 213 changes the physical block corresponding to the virtual block in accordance with the access status. The access is an access from the host apparatus 100 to the virtualization switch apparatus 200 and an access from the virtualization switch apparatus 200 to the storage apparatus 300 to 500. The data arrangement module 213 changes the physical block corresponding to the virtual block in accordance with the access status from the host apparatus 100 to the virtualization switch apparatus 200. The rearrangement processing to be executed by the data arrangement module 213 will be described below.

Figure 10:
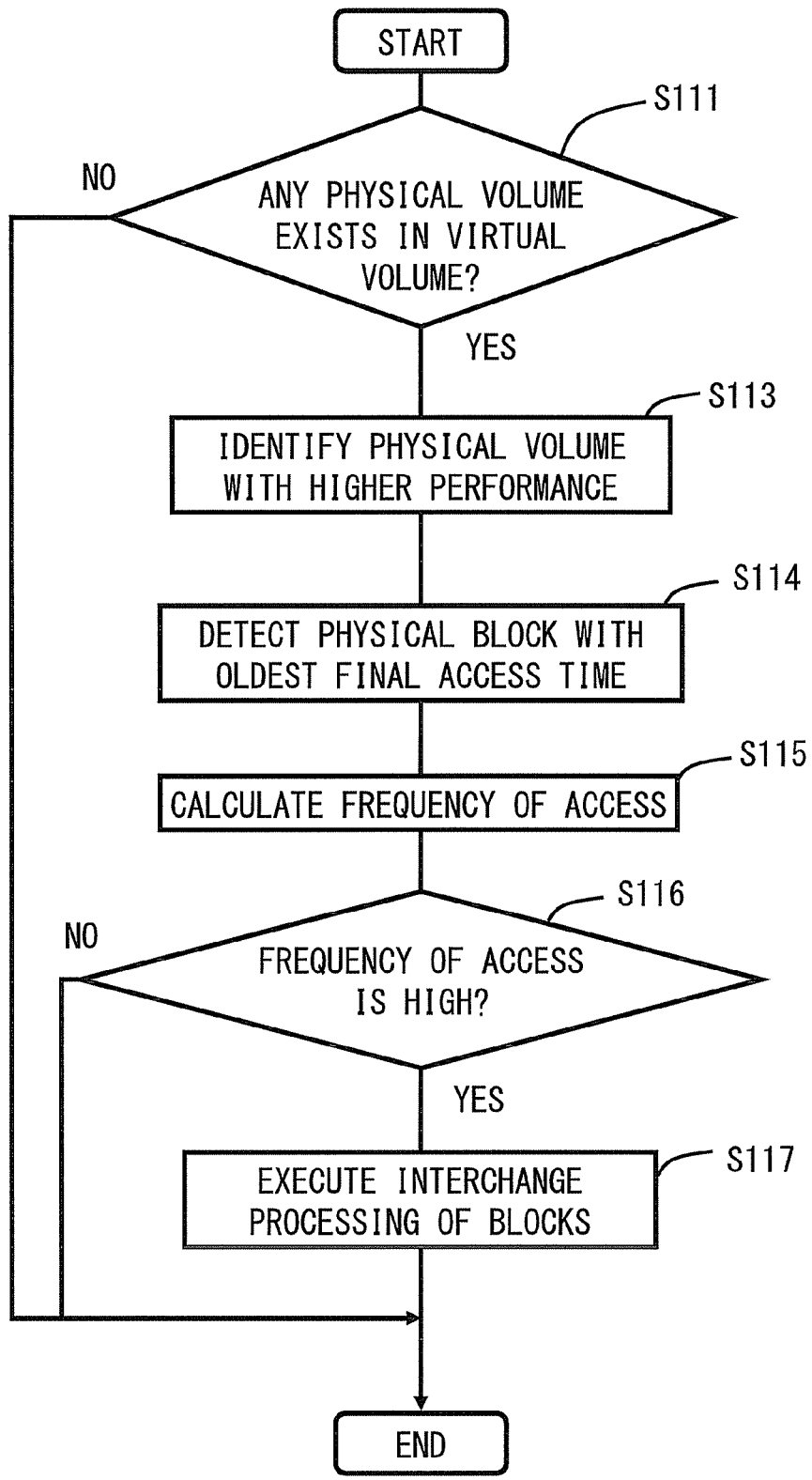
FIG. 10 is a flowchart for rearrangement processing.

FIG. 10 is a flowchart for the rearrangement processing of this embodiment.

The data arrangement module 213 determines whether any physical volume with a higher performance than the physical volume in the physical block corresponding to a subject virtual block of rearrangement processing (which will be called rearrangement block) exists in the virtual volume or not (S111). If not (S111: No), the data arrangement module 213 exits the rearrangement processing. For example, if the physical volume in the physical block corresponding to a rearrangement block is the physical volume with the highest performance in the virtual volume, it is determined that no physical volumes with a high performance exist.

It is also possible for the virtualization switch apparatus 200 to retrieve a physical volume with a higher performance than the physical volume that the rearrangement block belongs to from all physical volumes managed by the virtualization switch apparatus 200. The virtualization switch apparatus 200 can handle the physical volume for the virtual volume as a unit to interchange the retrieved physical volume and the physical volume that rearrangement block belongs to. Furthermore, the virtualization switch apparatus 200 can interchange physical volumes if the retrieved physical volume and the physical volume that the rearrangement block belongs to are matched in size of the storage areas.

On the other hand, if any physical volume with a higher performance than the physical volume in the physical block corresponding to the rearrangement block exists in the virtual volume (S111: Yes), the data arrangement module 213 identifies the physical volume with one-level higher performance than the physical volume that the physical block corresponding to the rearrangement block belongs to (S113). More specifically, the data arrangement module 213 retrieves from the virtual volume information 222 the physical volumes of the virtual volume that the rearrangement block belongs to. The data arrangement module 213 compares the performance information of the retrieved physical volumes and thus identifies the physical volume with one-level higher performance than the physical volume that the physical block belongs to, which corresponds to the rearrangement block.

Next, the data arrangement module 213 detects the physical block with the oldest final access time from physical blocks in the physical volume with one-level higher performance (S114). More specifically, the data arrangement module 213 identifies the virtual blocks corresponding to the virtual block in the physical volume with one-level higher performance with reference to the virtual volume information 222. The data arrangement module 213 retrieves the physical block with the oldest final access time within the identified virtual blocks from the access status information 224.

The data arrangement module 213 calculates the frequency of access of the virtual block corresponding to the physical block with the oldest final access time and the frequency of access of the subject virtual block of rearrangement processing (S115). The frequency of access may be calculated from the number of accesses from the host apparatus 100 to a virtual block, for example.

[Method for Calculating Frequency of Access]

Now, the processing of calculating the frequency of access in S115 to be performed by the data arrangement module 213 will be described. The data arrangement module 213 can calculate the frequency of access in consideration of not only the number of accesses but also the elapsed time from the last access.

Figure 11:
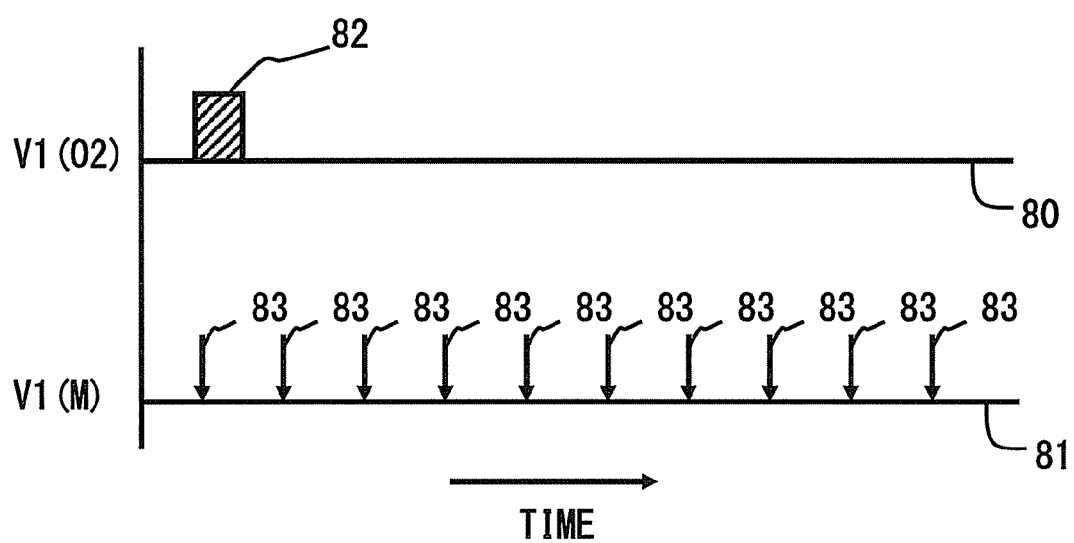
FIG. 11 is a diagram illustrating the frequency of access.

FIG. 11 is a diagram illustrating the frequency of access. In FIG. 11, the reference numeral 80 refers to the time axis of a virtual block V1(02). The reference numeral 81 refers to the time axis of a virtual block V2(M). The reference numeral 82 refers to an access group from the host apparatus 100 to the virtual block V1(02). The reference numeral 83 refers to accesses from the host apparatus 100 to the virtual block V2(M).

The accesses from the host apparatus 100 to a virtual volume are not always performed uniformly against times. The access group 82 exhibits that the accesses from the host apparatus 100 to the virtual block V1(02) concentrate in a short time. The virtual block V1(02) is intensively accessed from the host apparatus 100 temporarily but is rarely accessed after that. On the other hand, the accesses 83 from the host apparatus 100 to the virtual block V2(M) are distributed in time.

It is assumed here that the number of accesses of the access group 82 to the virtual block V1(02) is higher than the number of accesses 83 to the virtual block V2(M). Calculating the frequency of access only in consideration of the number of accesses from the host apparatus 100 to a virtual volume may arrange rarely accessed data to a physical volume with a high performance. In FIG. 11, the determination on the rearrangement only in consideration of the number of accesses results in the arrangement of the virtual block V1(02) to a physical volume with a high performance.

Accordingly, in this embodiment, the data arrangement module 213 calculates the frequency of access on the basis of the number of accesses from the host apparatus 100 to a virtual block and the elapsed time from the last access.

The data arrangement module 213 calculates the frequency of access by:

$$\text{(frequency of access)} = N \frac{A}{P} \qquad \text{[Expression 1]}$$

where the number of accesses to a virtual block is "A", the elapsed time from the last access is "P", and the coefficient is "N".

The coefficient "N" is a value held for each virtual block. As the value of the coefficient "N" increases, the importance of the value of the number of accesses increases in the frequency of access in Expression 1. As the value of the coefficient "N" decreases, the importance of the elapsed time from the final access increases in the frequency of access in Expression 1. The optimum value of the coefficient "N" depends on the tendency of use of the virtual volume.

In order to optimize the value of the coefficient "N", the data arrangement module 213 calculates the coefficient "N" to be used for calculating the frequency of access at the next update of the frequency of access by:

$$N_{next} = N_{now} + \left(N_{now}\left(\frac{T-P}{T+P}\right)\right) \qquad \text{[Expression 2]}$$

where "N (next)" is a coefficient "N" to be used for calculating the frequency of access next time, "N (now)" is a coefficient "N" to be used for calculating the frequency of access this time, and "T" is an average of "P" against accesses to each virtual block.

The frequency of access of a virtual block which is temporarily intensively accessed but is then rarely accessed decreases with the passage of time as a result of the decrease in value of the coefficient "N" by Expression 2. On the other hand, the frequency of access which is steadily accessed but at longer access intervals does not decrease easily as a result of the coefficient "N" kept constant by Expression 2.

Returning to the explanation on the processing on the flowchart in FIG. 10, the data arrangement module 213 determines whether the frequency of access of the rearrangement block is higher than the frequency of access of the virtual block corresponding to the physical block with the oldest final access time or not (S116).

If so (S116: Yes) and no empty areas are available in the physical volume with a high access characteristic, the data arrangement module 213 executes the interchange processing (S117). Notably, if any empty area is available in a physical volume with a high access characteristic, the data arrangement module 213 copies (or migrates) the data to the empty area to the physical volume. If any empty area is available in a physical volume with a high access characteristic, the determination processing in S116 and interchange processing in S117 are not necessary.

On the other hand, if the frequency of access of the subject block is lower than the frequency of access of the virtual block corresponding to the physical block with the oldest final access time (S116: No), the data arrangement module 213 exits the processing.

Notably, in a case where the access measurement module 212 is configured to obtain the number of accesses in the access status information 224 only, the access status information 224 is initialized at predetermined time intervals. The configuration allows the access measurement module 212 to obtain the tendency of the frequency of access of each block within a predetermined period.

[Interchange Processing on Physical Block Corresponding to Virtual Block]

Next, the interchange processing on the physical block corresponding to a virtual block to be performed by the data arrangement module 213 in S117 will be described. The interchange processing is processing for changing the correspondence between the addresses of a virtual block and a physical block.

Figure 12:
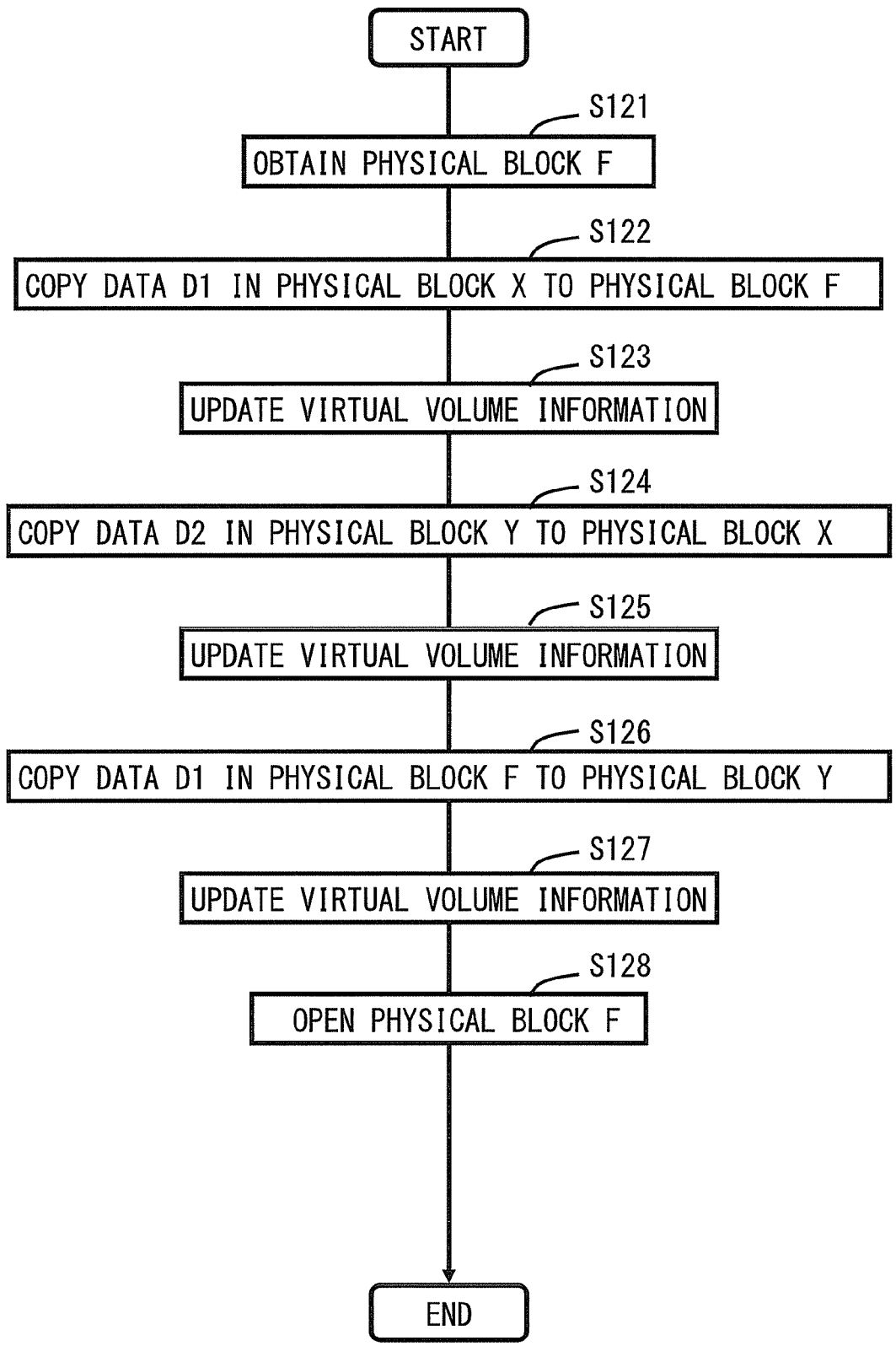
FIG. 12 is a flowchart for interchange processing on the physical block corresponding to a virtual block.

FIG. 12 is a flowchart for the interchange processing on the physical block corresponding to a virtual block. FIG. 13A, FIG. 13B, FIG. 13C, and FIG. 13D are diagrams illustrating the relationship among virtual blocks, physical blocks and data by the interchange processing.

It is assumed that there are a virtual block Vi, a virtual block Vj, a physical block X and a physical block Y. Data D1 corresponds to the virtual block Vi, and data D2 corresponds to the virtual block Vj. It is further assumed that there is an empty physical block F.

The empty physical block F is a physical block to be used in the interchange processing. The empty physical block F may be, for example, a physical volume with a low access performance, a fragmentation area caused by the difference between the logical size and physical size of a physical disk or a physical volume which is not defined to a virtual volume.

In FIG. 13A, the reference numeral 1001 refers to an initial relationship between a virtual block and a physical block and data stored in the physical block. At the initial state 1001, correspondence is established between the virtual block Vi and the physical block X and between the virtual block Vj and the physical block Y. At the initial state 1001, the physical block X stores the data D1, and the physical block Y stores the data D2.

The interchange processing causes the data arrangement module 211 to change the correspondence relationship between blocks from the initial state 1001 to the final state. The final state is the state in S127 where there are correspondences between the virtual block Vi and the physical block Y and between the virtual block Vj and the physical block X. At the final state, the physical block Y stores the data D1, and the physical block X stores the data D2.

The data arrangement module 213 obtains the physical block F (S121). In this embodiment, the data arrangement module 213 obtains a physical block in a physical volume which does not belong to a virtual volume managed by the virtualization switch apparatus 200 as the physical block F. The data arrangement module 213 may determine, for example, whether a subject volume belongs to a virtual volume or not on the basis of the correspondence information among volumes as illustrated in FIG. 5.

The data arrangement module 213 copies the data D1 in the physical block X to the physical block F (S122). The data arrangement module 213 updates the physical block corresponding to the virtual block Vi in the virtual volume information 222 from the physical block X to the physical block F (S123). FIG. 13B illustrates the state 1002 in S123.

Figures 13C, 13D, 14:
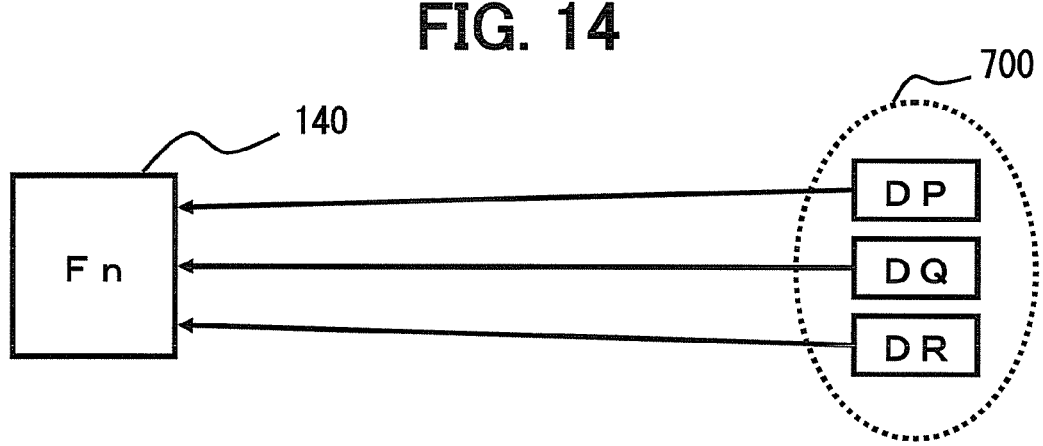

The data arrangement module 213 copies the data D2 in the physical block Y to the physical block X (S124). The data arrangement module 213 updates the physical block corresponding to the virtual block Vj in the virtual volume information 222 from the physical block Y to the physical block X (S125). FIG. 13C illustrates the state 1003 in S125.

The data arrangement module 213 copies the data D1 in physical block F to the physical block Y (S126). The data arrangement module 213 updates the physical block corresponding to the virtual block Vi in the virtual volume information 222 from the physical block F to the physical block Y (S127). FIG. 13D illustrates the state 1004 in S127.

The data arrangement module 213 opens the physical block F (S128).

The interchange processing allows the data arrangement module 213 to interchange the physical block corresponding to a virtual block by keeping the same virtual block to be accessed by the host apparatus 100.

Repeating the access measurement processing and the rearrangement processing by the virtualization switch apparatus 200 can arrange a virtual block with a higher frequency of access from the host apparatus 100 to a higher performance physical volume and arrange a virtual block with a lower frequency of access from the host apparatus 100 to a low performance physical volume. As a result, the virtualization switch apparatus 200 can increase the speed of the average access performance of the entire virtual volumes.

In this embodiment, the virtualization switch apparatus 200 performs the virtualization for storage apparatus. Therefore, in a case where a storage apparatus with a higher access performance is additionally provided in the virtualization switch apparatus 200, highly frequently accessed data can be migrated without the termination of the system.

[Relationship Between Files and Blocks]

Next, processing for enhancing the access performance by serializing files managed by the host apparatus 100 in a physical block will be described.

FIG. 14 is a diagram illustrating a relationship between a file and data. The file includes multiple data pieces. The reference numeral 140 refers to a file Fn to be handled by the host apparatus 100. The reference numeral 700 refers to data DP, DQ and DR to be handled by the virtualization switch apparatus 200 and the storage apparatus 300, 400 and 500. The file Fn includes the data DP, data DQ and data DR.

The file system module 111 in the host apparatus 100 accesses the data DP, DQ and DR in order to obtain data in the file Fn in FIG. 14. The file to be used by the host apparatus 100 executing an application program includes data in multiple blocks. Multiple virtual blocks included in one file managed by the file system module 111 in the host apparatus 100 may discrete in a virtual volume.

The discrete physical blocks corresponding to virtual blocks may belong to different physical volumes. In this case, the access from the host apparatus 100 to the virtualization switch apparatus 200 is the access to multiple virtual blocks. Furthermore, the virtualization switch apparatus 200 accesses multiple physical volumes. This may deteriorate the access performance more than that in a case where data exists in serial areas in a single physical volume.

Figure 15:
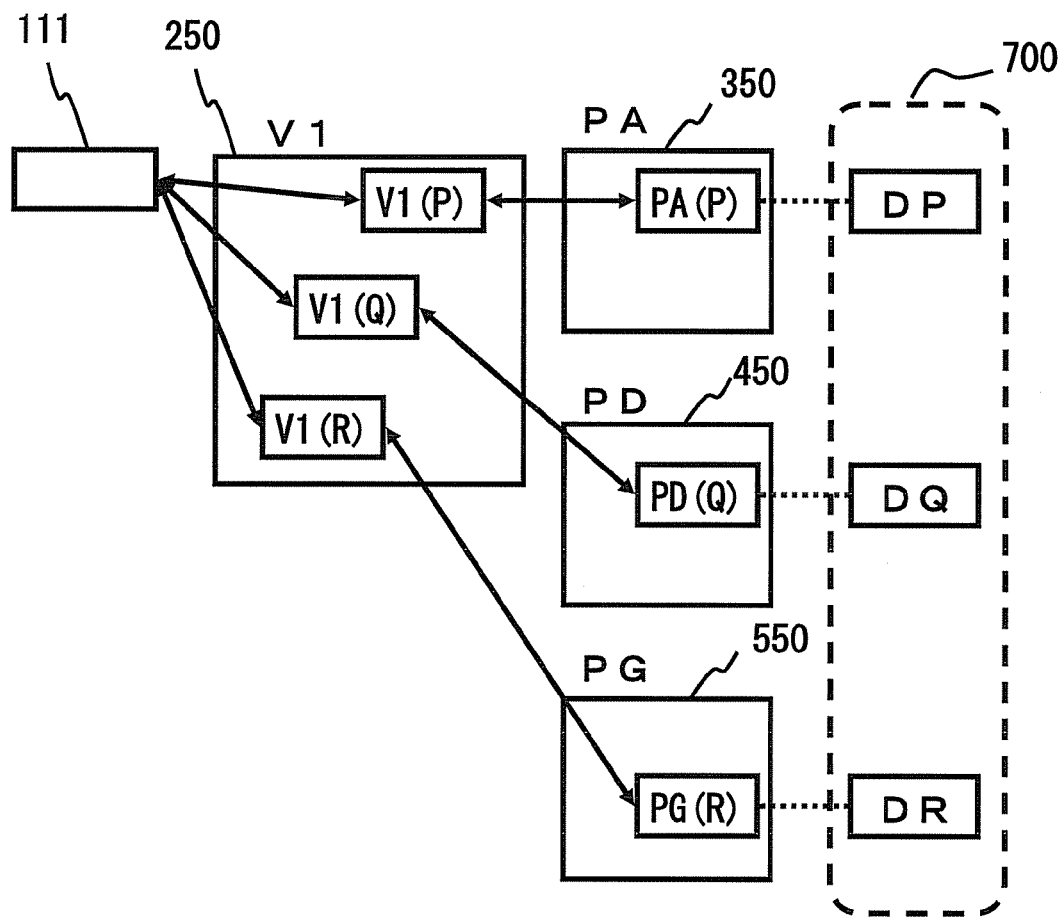
FIG. 15 is an explanatory diagram on data arrangement.

FIG. 15 is an explanatory diagram for data arrangement. The reference numeral 111 refers to a file system module, and the reference numeral 250 refers to a virtual volume V1. The reference numeral 350 refers to one physical volume PA in the storage apparatus 300, and the reference numeral 450 refers to one physical volume PD in the storage apparatus 400. The reference numeral 550 refers to one physical volume PG in the storage apparatus 500. The virtual volume V1 has a virtual block V1(P), a virtual block V1(Q) and a virtual block V1(R). The physical volume PA has a physical block PA(P). The physical volume PD has a physical block PD(Q). The physical volume PG has a physical block PG(R). The physical block PA(P) stores the data DP. The virtual block V1(P) is associated with the physical block PA(P). The physical block PD(Q) stores the data DQ. The virtual block V1(Q) is associated with the physical block PA(Q). The physical block PG(R) stores the data DR. The virtual block V1(R) is associated with the physical block PA(R).

Accordingly, the data arrangement module 213 rearranges the data in the physical volume such that fragmented files in multiple physical blocks can be stored in serial areas in a physical disk.

Figure 16:
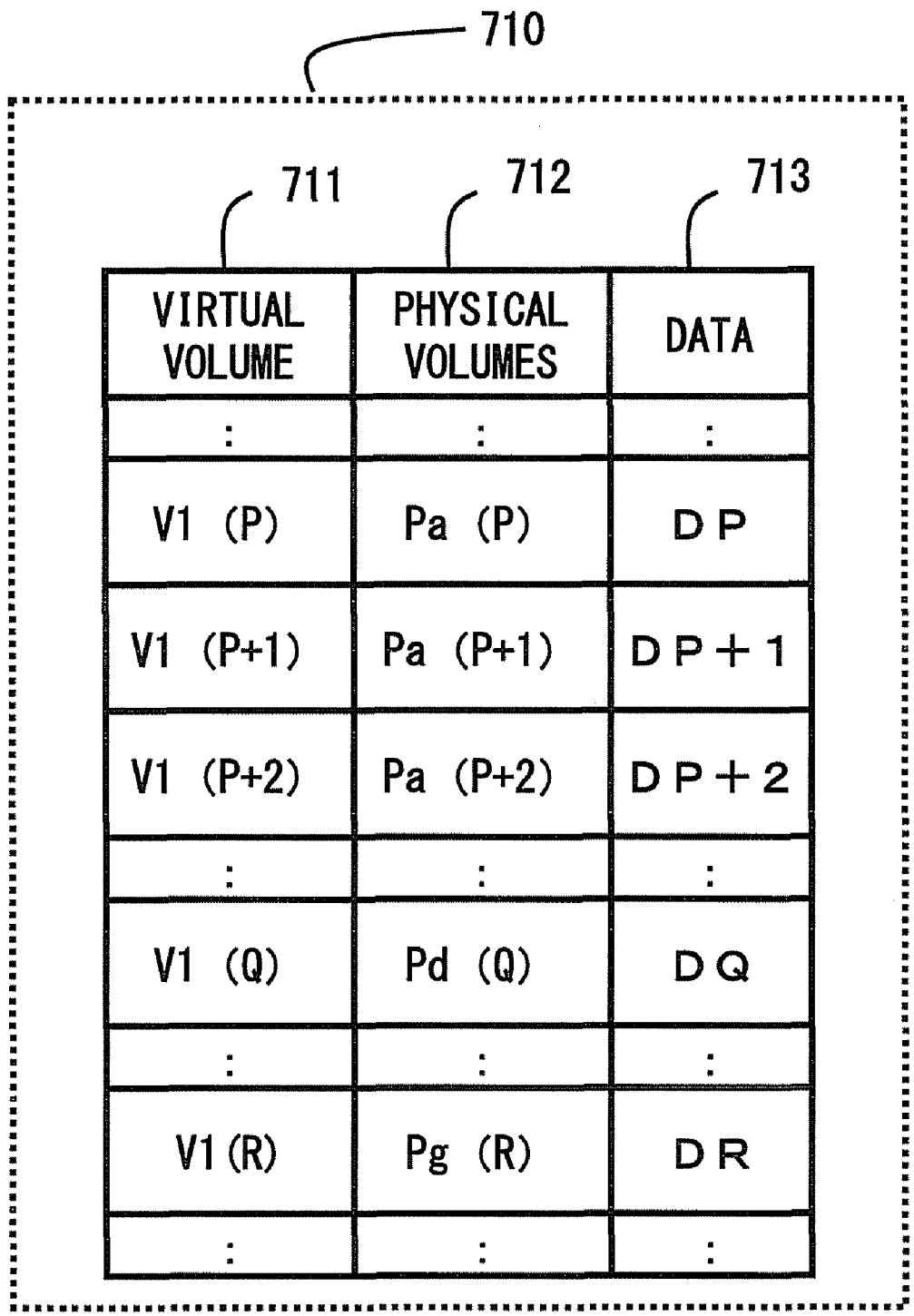
FIG. 16 is a diagram illustrating a relationship among virtual blocks, physical blocks and data in FIG. 15.

FIG. 16 is a diagram illustrating the relationship among virtual blocks, physical blocks and data in FIG. 15. FIG. 16 illustrates a state of the file Fn that the data DP, DQ and DR are discrete. The reference numeral 711 refers to address information of a virtual block. The reference numeral 712 refers to the address information of a physical block corresponding to the address information of the virtual block. The reference numeral 713 refers to data stored in a physical block. The virtual volume V1 includes three physical volumes (PA, PD and PG). The virtual block VI(P) corresponds to the physical block PA(P) of the physical volume PA. The virtual block V1(Q) corresponds to the physical block PD(Q) of the physical volume PD. The virtual block V1(R) corresponds to the physical block PG(R) of the physical volume PG. It is assumed that, in the physical volume PA, the physical block PA(P), physical block PA(P+1) and physical block PA(P+2) are serial areas. It is assumed that the data in the virtual block V1(P) is DP, and the data in the virtual block V1(Q) is DQ and data in the virtual block V1(R) is DR. It is assumed that the data in the physical block PA(P+1) is DP+1, and the data in the physical block PA(P+2) is DP+2.

It is assumed that the storage apparatus 300 to 500 managed by the virtualization switch apparatus 200 has a physical volume PX with which no virtual volumes are associated. It is assumed that the physical volume PX has an empty physical block PF.

Figure 17:
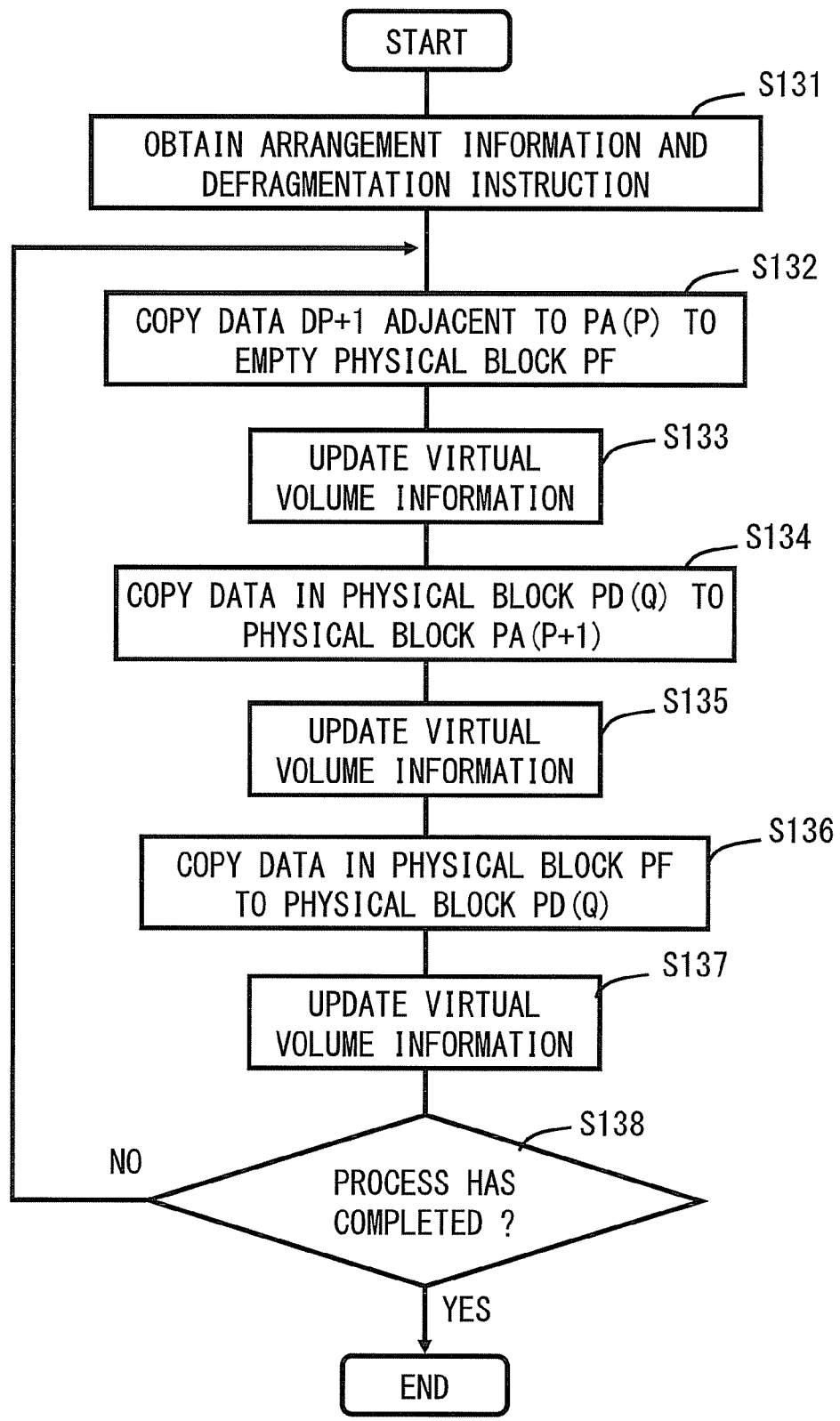
FIG. 17 is a flowchart for processing of rearranging data to serial blocks.

FIG. 17 is a flowchart for processing of rearranging data to serial blocks.

The data arrangement module 213 obtains, from the host apparatus 100, arrangement information in the virtual volume V1 (or address information of virtual block and file size information (information on the number of blocks to be used by a file)) and defragmentation instruction for the file Fn (S131). Notably, the file Fn includes the data DP, DQ and DR. The defragmentation instruction is executed if the host apparatus 100 side determines it is necessary at the time with a lower number of accesses by the host apparatus 100 or when the host apparatus 100 determines that time for accessing the data is higher than a predetermined value.

The data arrangement module 213 copies data DP+1 in the physical block PA(P+1) adjacent to the physical block PA(P) to the empty physical block PF (S132). The data arrangement module 213 updates the virtual volume information 222. More specifically, the data arrangement module 213 updates the physical block corresponding to the virtual block V1(P+1) from the physical block PA(p+1) to the physical block PF(S133).

The data arrangement module 213 copies the data DQ in the physical block PD(Q) to the physical block PA(P+1) (S134). The data arrangement module 213 updates the virtual volume information 222. More specifically, the data arrangement module 213 updates the physical block corresponding to the virtual block V1(Q) from the physical block PD(Q) to the physical block PA(P+1) (S135).

The data arrangement module 213 copies the data DP+1 in the physical block PF to the physical block PD(Q) (S136). The data arrangement module 213 updates the virtual volume information 222. More specifically, the data arrangement module 213 updates the physical block corresponding to the virtual block V1(P+1) from the physical block PF to the physical block PD(Q) (S137).

The data arrangement module 213 determines the rearrangement of all data in the file Fn has completed or not. If so (S138: Yes), the data arrangement module 213 exits the processing. If not (S138: No), the data arrangement module 213 continuously performs the processing in and after S132 on the remaining data. More specifically, in FIG. 15, the data arrangement module 213 performs the same processing on the physical block PA(P+2) and physical block PG(R) of the data.

Figure 18:
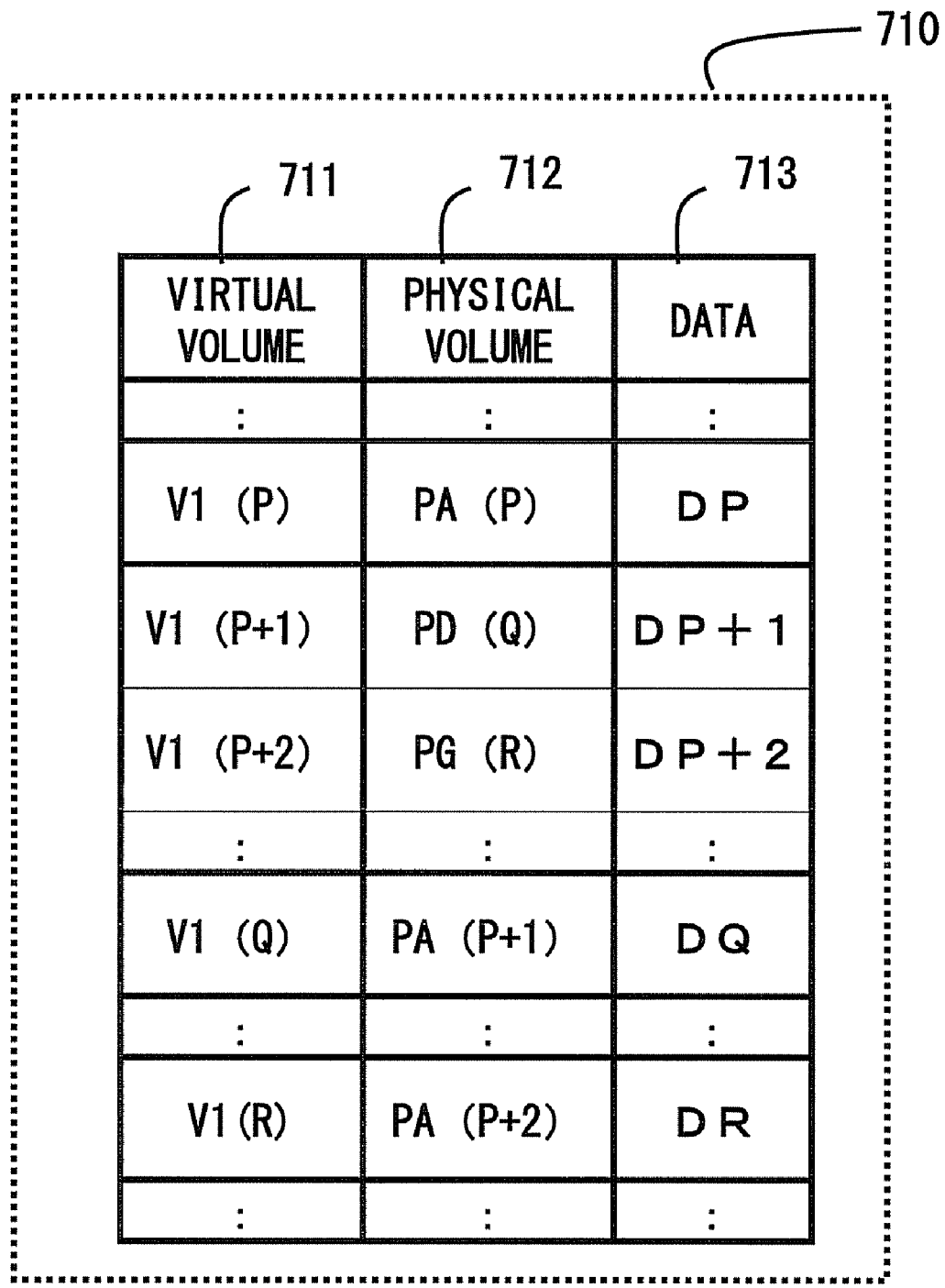
FIG. 18 is a diagram illustrating the relationship among virtual blocks, physical blocks and data after the rearrangement processing is performed thereon.

FIG. 18 is a diagram illustrating the relationship among virtual blocks, physical blocks and data after the rearrangement processing is performed thereon. The rearrangement processing stores the data DP, data DQ and data DR in the file Fn in the physical block PA(P), physical block PA(P+1) and physical block PA(P+2), respectively. Therefore, even when the addresses of the virtual blocks are discrete, the virtualization switch apparatus 200 can access serial physical blocks within the physical volume.

Notably, in a case where multiple empty physical blocks PF are available, the data arrangement module 213 can perform the processing relating to the data DQ and the processing relating to the data DR in parallel. The example above assumes that the processing rearranges data to the block adjacent to the physical block PA(P). However, the subject block of the rearrangement does not have to be adjacent to the physical block PA(P), but data may be arranged in arbitrary serial blocks.

Because the data arrangement module 213 arranges fragmented files in virtual blocks to serial physical blocks, the host apparatus 100 can access the physical blocks sequentially. As a result, the access performance can be enhanced.

The virtualization switch apparatus 200 performs the defragmentation processing on physical volumes in a virtual volume only. Therefore, the host apparatus 100 does not have to be aware of the data rearrangement.

The use of an empty physical volume as a temporary data storage area in performing data rearrangement can eliminate the necessity for preparing a memory for the rearrangement processing, in the virtual switch apparatus 200. Furthermore, the increase in temporary data storage area can easily enhance the performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A method for controlling a switch apparatus connected to a first storage apparatus, a second storage apparatus, and a host, the switch apparatus managing a virtual storage area maintained by at least one of the first storage apparatus and second storage apparatus, the host capable of accessing the virtual storage area by transmitting a command for identifying a subarea of the virtual storage area to be accessed, the second storage apparatus being capable of allowing an access faster than the first storage apparatus does, the method comprising:
   receiving a command for accessing at least one of the subareas from the host;
   determining which of the first and second storage apparatuses maintains the subarea to be accessed;
   accessing the subarea corresponding to the command;
   detecting a frequency of access to each of the subareas; and
   moving either of data stored in the subareas maintained in the first storage apparatus and having higher frequency of access than data stored in the subareas maintained in the second storage apparatus into the subareas maintained in the second storage apparatus, and data stored in the subareas maintained in the second storage apparatus and having lower frequency of access than data stored in the subareas maintained in the first storage apparatus into the subareas maintained in the first storage apparatus.

2. The method according to claim 1, wherein the frequency of access is calculated in accordance with the number of accesses from the host.

3. The method according to claim 1, wherein the frequency of access is calculated in accordance with the number of accesses in each predetermined period of time.

4. A switch apparatus comprising:
   an interface connected to a first storage apparatus, a second storage apparatus, and a host, the second storage apparatus being capable of allowing an access faster than the first storage apparatus does;
   a processor for executing a process comprising:
      managing a virtual storage area maintained by at least one of the first storage apparatus and second storage apparatus, the virtual storage area including a plurality of subareas;
      receiving a command for accessing at least one of the subareas from the host;
      determining which of the first and second storage apparatuses maintains the subarea to be accessed;
      accessing the subarea corresponding to the command;
      detecting a frequency of access to each of the subareas; and
      moving either of data stored in the subareas maintained in the first storage apparatus and having higher frequency of access than data stored in the subareas maintained in the second storage apparatus into the subareas maintained in the second storage apparatus, and data stored in the subareas maintained in the second storage apparatus and having lower frequency of access than data stored in the subareas maintained in the first storage apparatus into the subareas maintained in the first storage apparatus.

5. The switch apparatus according to claim 4, wherein the frequency of access is calculated in accordance with the number of accesses from the host.

6. The switch apparatus according to claim 4, wherein the frequency of access is calculated in accordance with the number of accesses in each predetermined period of time.

* * * * *